J. GOOTEE.
COUPLING FOR HOSE OF AIR LINES.
APPLICATION FILED OCT. 24, 1918.

1,313,225.

Patented Aug. 12, 1919.

Inventor,
James Gootee,
By
Attorney

UNITED STATES PATENT OFFICE.

JAMES GOOTEE, OF WILMINGTON, DELAWARE.

COUPLING FOR HOSE OF AIR-LINES.

1,313,225.  Specification of Letters Patent.  Patented Aug. 12, 1919.

Application filed October 24, 1918. Serial No. 259,467.

*To all whom it may concern:*

Be it known that I, JAMES GOOTEE, a citizen of the United States of America, and resident of Wilmington, in the county of New Castle and State of Delaware, have invented certain new and useful Improvements in Couplings for Hose of Air-Lines, of which the following is a specification.

This invention relates to couplings for pipes or brake air lines and has for its object the provision of novel means whereby the coupling heads may be expeditiously and securely connected together and whereby when pull is exerted on the air lines between cars, the coupling heads may be permitted to disengage each other without undue loss as compared with that which occurs with coupling heads now in common use wherein when an accident occurs to the train line or the coupling thereof, the coupling heads become fractured and lost, thus entailing an expense which is corrected by the present invention.

A further object of this invention is to produce couplings or air brake holders which will withstand strain incident to normal use, but which will become fractured when subjected to undue strain, the fractured part releasing the coupling heads which remain intact except as to the comparatively inexpensive fractured element.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1:
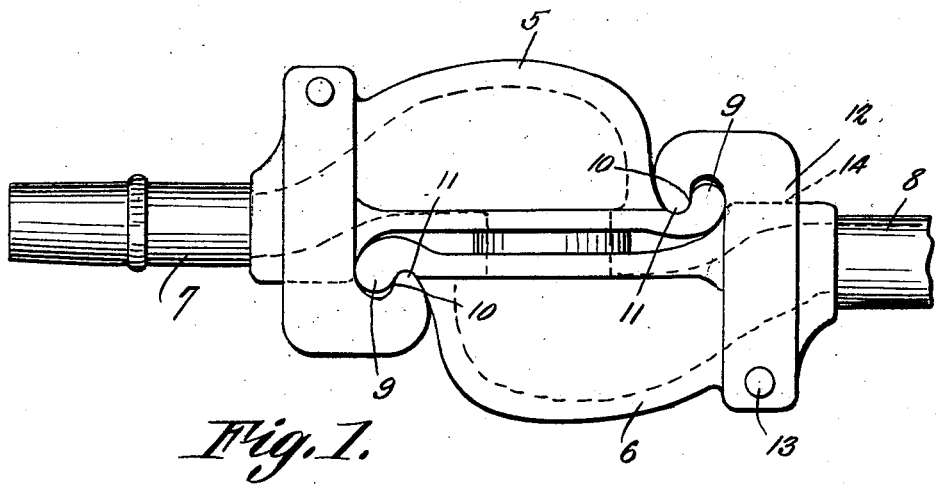
Figure 1 illustrates a view in elevation showing the heads coupled.
Figure 2:
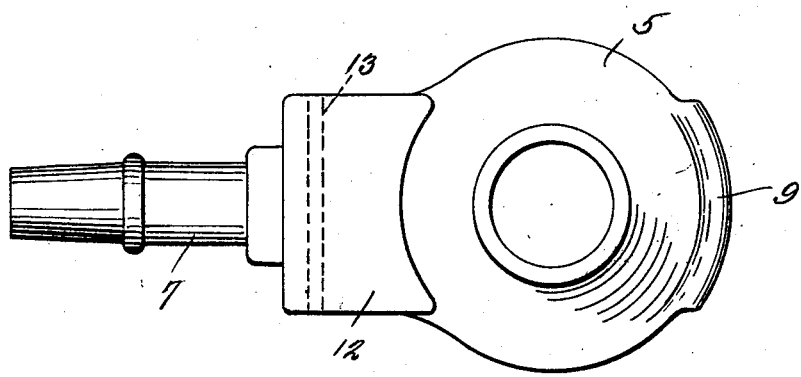
Fig. 2 illustrates a plan view of one of the said heads.

In these drawings 5 and 6 denote couplings for air line hose which are usually employed between cars or between a car and a locomotive and these heads have nipples 7 and 8 respectively adapted for attachment to the hose.

Each head includes a curved surface 5' and has a flange 9 with a recess 10 forming a seat for engaging a lug 11 of a clamping member 12, which clamping member is secured to the head by a pin 13 which extends through an aperture 14 of the head and through apertures of the clamping member, it being shown that the clamping member comprises a bifurcated portion which embraces the sides of the head and it has a shoulder 14 resting on the face of the head whereas the lug 10 extends outwardly to engage the flange of the coacting head.

The pins 13 are made of relatively weak material which will either shear or fracture when undue strain occurs as it does when cars separate without uncoupling the hose line and when such fracture occurs, the member 12 releases the flange which it engaged and the heads may then disconnect without injury to any other part of the coupling, and hence the only part lost would be the pin 13 and the clamping member.

The relation of the pins and the shoulder to the head insures proper holding and positioning of the clamping member so long as the pin 13 is intact.

While I have referred to the member 13 as a pin, it is to be understood that any element may be employed in this connection as for instance, a cotter pin, bolt or other member which will hold the clamping member on the head.

I claim

1. In a coupling for hose of air lines, coupling heads, a clamping member for each coupling head, said clamping member comprising a bifurcated element, the arms of which extend downwardly and embrace the sides of the head, said arms terminating at a point adjacent the curved surface of the head to which the clamping element is secured, said clamping element having a shoulder engaging a surface of the head, a lug extending from the clamping member adapted to engage a flange of the interlocking head, and a pivot pin of relatively weak material connecting the clamping member and head at the ends of the arms, said pin adapted to be sheared when undue strain is applied to the coupling heads.

2. In a coupling for hose of air lines, heads adapted to be coupled together, each of said heads having a flange, a clamping member having arms embracing the sides of the head, said clamping member adapted to interlock with the flange of the companion head, and relatively weak means for connecting the ends of the arms to a head, said means being adapted to shear and release the clamping member when undue strain is applied to the heads.

JAMES GOOTEE.

Copies of this patent may be obtained for five cents each, by addressing the "Commissioner of Patents, Washington, D. C."